United States Patent [19]

Duenke

[11] 4,369,353
[45] Jan. 18, 1983

[54] APPARATUS AND METHOD OF DRYING A TRANSFORMER

[76] Inventor: Clarence G. Duenke, P.O. Box 1587, San Angelo, Tex. 76901

[21] Appl. No.: 279,707

[22] Filed: Jul. 2, 1981

Related U.S. Application Data

[63] Continuation of Ser. No. 122,804, Feb. 19, 1980, abandoned, which is a continuation-in-part of Ser. No. 809,267, Jun. 23, 1977, abandoned.

[51] Int. Cl.³ ............................................. H05B 1/02
[52] U.S. Cl. ..................................... 219/492; 219/494; 219/519; 361/42; 361/57; 324/51; 324/65 R; 310/68 C
[58] Field of Search ............... 219/494, 499, 501, 519, 219/497, 495; 361/42, 35, 59; 324/51, 65 R; 310/68 C, 68 B

[56] References Cited

U.S. PATENT DOCUMENTS

| | | |
|---|---|---|
| 3,195,044 | 7/1965 | Flanagan . |
| 3,373,500 | 3/1968 | Winter . |
| 3,483,470 | 12/1969 | Tsergas . |
| 3,746,979 | 7/1973 | Kildishev et al. . |
| 3,789,190 | 1/1974 | Orosy . |
| 3,845,274 | 10/1974 | Krenke et al. . |
| 3,939,687 | 2/1976 | Waldron . |
| 3,946,200 | 3/1976 | Juodikis . |
| 3,959,692 | 5/1976 | Wetzel . |
| 4,110,807 | 8/1978 | Neuhouser . |
| 4,159,501 | 6/1979 | White . |

Primary Examiner—M. H. Paschall
Attorney, Agent, or Firm—Hubbard, Thurman, Turner & Tucker

[57] ABSTRACT

An apparatus and method of drying a transformer by applying current to a winding thereof in a controlled fashion. Alternating with periods of applying the current to the winding, the electrical resistance of the winding is periodically measured using a bridge circuit. The application of the current is controlled, dependent on the results of the resistance measurements, to discontinue the application of current when the measured resistance is equal to or greater than a preset resistance. The current application is resumed when the measured resistance falls below the preset resistance. In a preferred form insulation resistance is tested by measuring leakage current after each measurement of winding resistance and when leakage resistance reaches an acceptable level the apparatus is shut down.

11 Claims, 5 Drawing Figures

APPARATUS AND METHOD OF DRYING A TRANSFORMER

This application is a continuation of Application Ser. No. 122,804, filed Feb. 19, 1980, now abandoned, which is a continuation-in-part of Application Ser. No. 809,267 filed June 23, 1977, now abandoned.

BACKGROUND OF THE INVENTION

The invention relates to an apparatus and method for drying a transformer.

References known to the present applicant and believed to be possibly relevant to the present invention include the following U.S. Pats. Nos. 3,373,500 issued to Winter; 3,789,190 issued to Orosy, et al; 3,946,200 issued to Juodikis; and 3,959,692 issued to Wetzel. The Winter patent in particular teaches the necessity for drying transformers prior to filling with oil and the usefulness of internal heating of the transformers during evacuation to enhance the drying. The other patents in general teach various automatic temperature controls for resistive or heating elements. None of these patents actually provides a power transformer heating arrangement which allows the accurate heating of a transformer winding of unknown resistance to a preselected optimum temperature for drying.

As taught by the above referenced patents, it is important during the manufacture or repair of power transformers to be sure that the internal insulation is free of water before the unit is filled with oil and sealed. In the repair situation, a wide variety of transformers may be encountered having various winding resistances. While it is known that the winding resistance can indicate the internal temperature of the windings, it is necessary to know the cold resistance of a winding as well as to measure the resistance during heating since it is, in effect, the percentage increase resulting from the heating which indicates the temperature of the winding. Most available apparatus assumes that the windings are of a known cold resistance value or that the actual resistance will be measured and the appropriate high temperature resistance will then be calculated and set into the apparatus.

In the drying process the transformer casing is held at a very low pressure to enhance drying. The heating and evacuation are generally continued for a period of time sufficiently long to guarantee appropriate drying of transformer insulation for any type of transformer which may be encountered. It would be desirable to discontinue the heating and evacuation of the transformer as soon as an appropriate level of dryness has been reached to thereby reduce the total time required for drying.

SUMMARY OF THE INVENTION

Accordingly, an object of the present invention is to provide an improved apparatus and method for drying power transformer insulation.

Another object of the present invention is to provide an automatic control arrangement for heating power transformer windings to a preselected high temperature.

Another object of the present invention is to provide an arrangement for detecting the actual transformer insulation resistance and discontinuing the drying process when an acceptable value has been detected.

In accordance with the present invention, there is provided an apparatus embodying the following method of heating a winding. Alternately, the electrical resistance of the winding is measured, and current is applied to the winding. The application of current is controlled dependent on the results of the resistance measurement to discontinue the current application when the measured resistance is equal to or greater than a preset resistance. The application of current is resumed when the measured resistance falls below the preset resistance.

In a preferred embodiment, the resistance measurement includes connecting the winding into an arm of a bridge circuit having a balancing resistance in another arm. At an initial temperature, before the first application of current, the bridge containing the winding is balanced by adjustment of the balancing resistance to an intial value. Then the balancing resistance is preset by increasing it above the initial value. The amount of increase is equal to the temperature coefficient of the windings multiplied by the initial value of the balancing resistance and by the desired windings temperature increase above the initial temperature. During subsequent alternating periods of resistance measurement and current application, the winding is heated and its resistance increases. When the temperature of the winding increases the desired amount above the initial temperature, the resistance of the winding will equal the preset balancing resistance and consequently balance the bridge. When the bridge is substantially balanced, the application of current and thus the heating, is discontinued. Thereafter, when the winding temperature and resistance fall so that the bridge becomes unbalanced, the current application is resumed.

In a further preferred embodiment, the insulation resistance between transformer windings is measured after each winding resistance measurement to determine if the drying process should be discontinued. Switching means is provided for effectively shutting down the drying apparatus when an acceptable insulation resistance level is detected.

Thus, in the present invention, heating current to transformer windings is regulated by the resistance of the windings. This resistance is indicative of the temperature throughout the various parts of the windings. The result is a controlled heating based on a much more accurate assessment of temperature in the windings than that produced by an external thermostat.

BRIEF DESCRIPTION OF THE DRAWINGS

The present invention may be better understood by reading the following detailed description of the preferred embodiment with reference to the accompanying drawings wherein.

DESCRIPTION OF THE PREFERRED EMBODIMENTS

Figure 1:
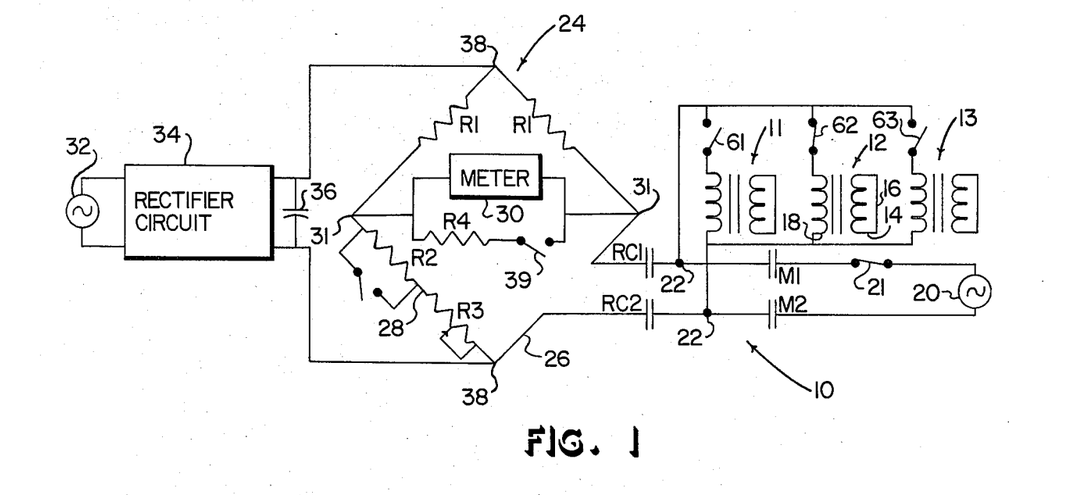
FIG. 1 is a schematic diagram of a transformer drying apparatus according to a first embodiment of the invention.
Figure 2:
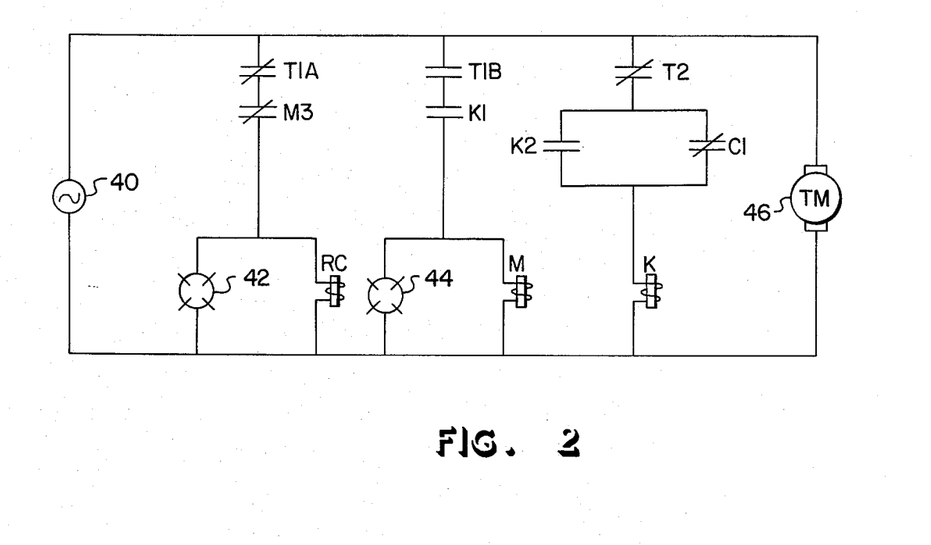
FIG. 2 is a schematic diagram of a switching circuit that is a part of the apparatus of FIG. 1.

FIGS. 1 and 2 show the circuits of a transformer dryer according to one embodiment of the present invention, indicated generally in FIG. 1 by the reference numeral 10. It is possible to dry several transformers simultaneously; three transformers 11, 12 and 13 are shown in FIG. 1. They are connected into the circuit by means of conventional socket receptacles and may be switched in and out by means of switches 61, 62 and 63. For clarity and simplicity, much of the following description will refer to a single transformer 12, with the understanding that others can also be dried, as disclosed hereinafter.

One of the windings 14 of transformer 12 has a shorting connection 16 connected between its terminals. This may be either of the windings but the preferred practice is to thus short the secondary or low voltage winding of the transformer. The other winding, for example the primary winding, is connected at terminals 22 to the transformer drying circuit 10.

A source of alternating current 20 is connected to the terminals 22 through a switch 21 and relay contacts M1 and M2. Source 20 can, for example, have a potential equal to twice the impedance voltage of transformer 12. The terminals 22 are connected through another pair of relay contacts RC1 and RC2 into an arm 26 of a Wheatstone bridge circuit 24. In second and third arms of the bridge 24 are fixed equal resistors R1. In the fourth arm 28 is a configuration providing a variable balancing resistance. One resistor R2 can be included in the arm or shunted by closing a switch S3. When R2 is in the circuit, it is in series with a variable resistance R3.

Connected between two opposite corners 31 of the bridge 24 is a dc null meter 30. Meter 30 has the important characteristic that it opens a relay contact (shown as C1 in FIG. 2,) when a potential measured by the meter is approximately zero. The range about a null which will cause the relay contact C1 to open is adjustable. For example, meter 30 can be a Barcol Model 72A CONT. In parallel with meter 30 is a resistor R4 in series with a switch 39. The resistor R4 is a shunting resistance for extending the range of meter 30. An ac potential from source 32 is full wave rectified by rectifier circuit 34 and smoothed by capacitor 36 to provide a dc potential at the other opposite corners 38 of bridge 24.

The circuit of FIG. 2 is energized by an ac potential source 40. A parallel combination of a relay coil RC and an indicator light 42 is connected in series with relay contacts T1A and M3 to be driven by source 40. Similarly, the parallel combination of relay coil M and an indicator light 44 is in series with relay contacts K1 and T1B across source 40. The parallel combination of relay contacts K2 and C1 are in series with relay contact T2 and the coil of a relay K.

Also connected to a potential source 40 is a timing motor 46. The operation of timing motor 46 is as follows. Periodically, for example each 60 seconds, the motor initiates a cycle in which contact T1B is closed for a portion of the cycle, while contact T1A is open for that same portion. Then contact T1B opens for the remaining portion of the cycle, during which contact T1A is closed. A third contact T2, shown as normally closed, opens briefly and closes again on each occasion that contacts T1A and T1B switch open or closed.

In the operation of the transformer dryer 10, the switching circuit of FIG. 2 causes the transformer terminals 22 to be alternately connected to ac source 20 and bridge 24. For example, terminals 22 can be connected to source 20 for thirty seconds, then to bridge 24 for thirty seconds. The manner in which this is accomplished is described below in connection with FIG. 3.

Before any current from source 20 is actually applied to transformer 12, bridge 24 must be balanced with respect to the initial (room) temperature resistance of the transformer 12 windings as measured across terminals 22. This can be accomplished by opening switch 21 to disconnect source 20, then adjusting the balancing resistance comprised of resistors R2 and R3, until a null is detected by meter 30 during the thirty second periods when bridge 24 is connected to windings 22.

When the balance of bridge 24 has been achieved, the resistance in arm 28 of the bridge is increased a preselected amount. The amount is determined by first selecting the increase in temperature (above room temperature) of the transformer 12 windings, considered desirable for the drying process. Then the initial balancing resistance is multiplied by this selected temperature increase and by the temperature coefficient of resistance (expressed in units of $°C.^{-1}$) appropriate to the material of the windings. Alternatively, the temperature coefficient of resistance can be expressed in units of "°C.", as 234.5° C. for copper and 225° C. for aluminum. In this case, the product of the intial balancing resistance and desired temperature increase are divided by the temperature coefficient of resistance (expressed in units of °C.).

Once the balancing resistance in arm 28 of bridge 24 has been preset, switch 21 is closed so that current from source 20 is periodically applied to transformer terminal 22. Alternating with the application of current from source 20, the transformer 12 is connected into bridge 24 to measure the resistance of the transformer windings. As this process continues transformer 12 is heated by the current from source 20, increasing both the temperature and the resistance of the windings. When the temperature of the windings reaches the desired level, the resistance of the windings becomes equal to the value preset in arm 28 of bridge 24. When this occurs, meter 30 detects a null between corners 31, as is well understood in the art. When the null is detected, meter 30 causes relay contact C1 in the circuit of FIG. 2 to open. This has the result that relay contacts M1 and M2 are held open during the next period in which the transformer would otherwise be energized from source 20. As the flow of electrical energy to the transformer 12 ceases, the windings being to cool. The winding resistance decreases and bridge 24 moves away from the balanced condition. Eventually when the potential measured by meter 30 has sufficiently departed from a null, relay contact C1 is again closed and current source 20 is again periodically connected to transformer terminals 22. This continues until heating causes the resistance of the transformer winding to balance bridge 24 again, and so on. In this way the temperature of the transformer windings is held near a desired value.

Figure 3:
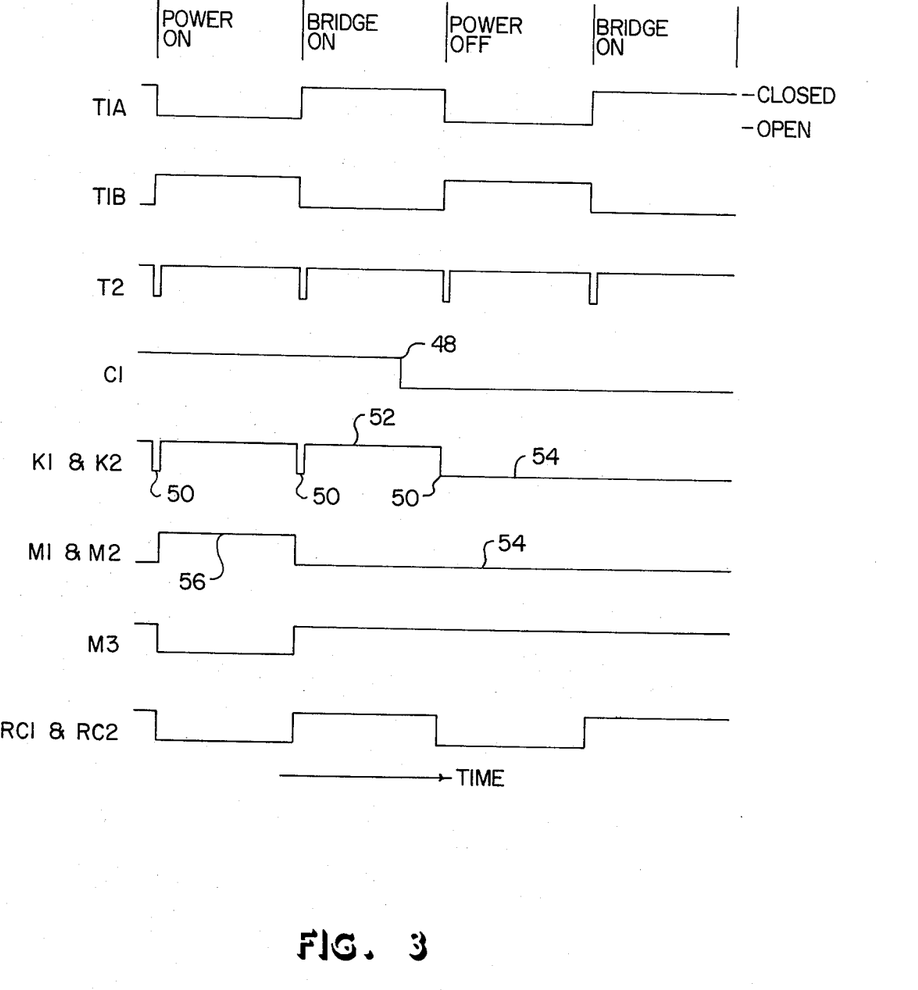
FIG. 3 is a diagram showing the time relation of the opening and slosing of switches in FIGS. 1 and 2.

The operation of the switching circuit in FIG. 2 is illustrated by the switching diagrams of FIG. 3. As indicated there, contact T1A is periodically opened by the timing motor 46. At the times when contact T1A is open, contact T1B is closed by motor 46. At the switching transitions for these contacts, the third contact T2 opens briefly, then returns to its normally closed condition.

The contact C1, operated by meter 30, is shown first in its closed condition; then it is opened at instant 48 as meter 30 detects a null.

Contacts K1 and K2 are closed upon the condition that current is flowing through the coil of relay K. This can only happen when contact T2 is closed; therefore, contacts K1 and K2 are always open during the intervals 50 when contact T2 is open. Upon the closing of contact T2, if contact C1 is closed, then current flows in the coil of relay K and contact K2 is closed. This means that even if contact C1 opens, as it does during interval 52, current continues to flow through the coil of relay K, holding contacts K1 and K2 closed. That is, relay K is latched closed. However, if upon the closing of contact T2, contact C1 is open, there is no path to energize relay K, so that contacts K1 and K2 remain open, as in interaval 54.

The energizing of relay M and its indicator light 44 occurs upon the simultaneous closing of contacts T1B and K1. Thus, it can be seen from FIG. 3 that contacts M1 and M2 are closed during interval 56. During interval 54, contact T1B is closed, but contact K1 is open, so contacts M1 and M2 are open, disconnecting ac source 20 from the transformer 12. Contact M3 is open when contact M1 is closed and closed when contact M1 is open.

Relay RC and its indicator light 42 are energized when contacts M3 and T1A are simultaneously closed. Thus in FIG. 3, the closing of contacts RC1 and RC2 in FIG. 3 largely follow those of T1A. Contact M3 assures that the contacts RC1 and RC2 are not closed at the same time as contacts M1 and M2.

The overall operation of the switching circuit illustrated in FIGS. 2 and 3 results in contacts RC1 and RC2 periodically closing to connect transformer 18 to bridge 24. Contacts M1 and M2, connecting ac source 20 to transformer 12 close at the times when the RC contacts are open, except during periods such as interval 54 when meter 30 has detected a null. In these periods ac source 20 ceases to energize and heat the transformer 18. When the potential detected by meter 30 is no longer within a specified range of null, contact C1 again closes, and source 20 is periodically connected to transformer 12.

When multiple units, for example transformers 11, 12 and 13, are dried simultaneously, the total resistance across terminals 22 is the parallel combination of the individual transformer resistances. The initial balancing resistance will be lower than for one of the transformers alone. As with a single transformer, the initial balancing resistance is multiplied by the selected temperature increase and by the temperature coefficient of the windings to obtain an amount by which the initial balancing resistance is increased during the drying operation. The shunt resistance R4, which extends the range of meter 30, permits the dryer 10 to achieve satisfactory control for a varying number of transformers such as 11, 12 and 13.

As it is described above, the transformer drying is performed by applying current to a high voltage primary with the secondary shorted. This is done because ordinarily the high voltage primary is formed of wire having a small cross-sectional area and is therefore more susceptible to overheating. This methodology may be extended to cases such as transformers having a tertiary winding for suppressing harmonics. In the latter case, the lowest resistance winding can be short-circuited. It should be apparent that various arrangements are possible, all making use of the benefits of the invention. For example, each winding could be energized and controlled by a system such as apparatus 10, using a dc current source for heating in order to electrically decouple the windings. It should also be apparent that the apparatus 10 would be useful for the controlled heating of electrical elements other than transformer windings.

Figure 4:
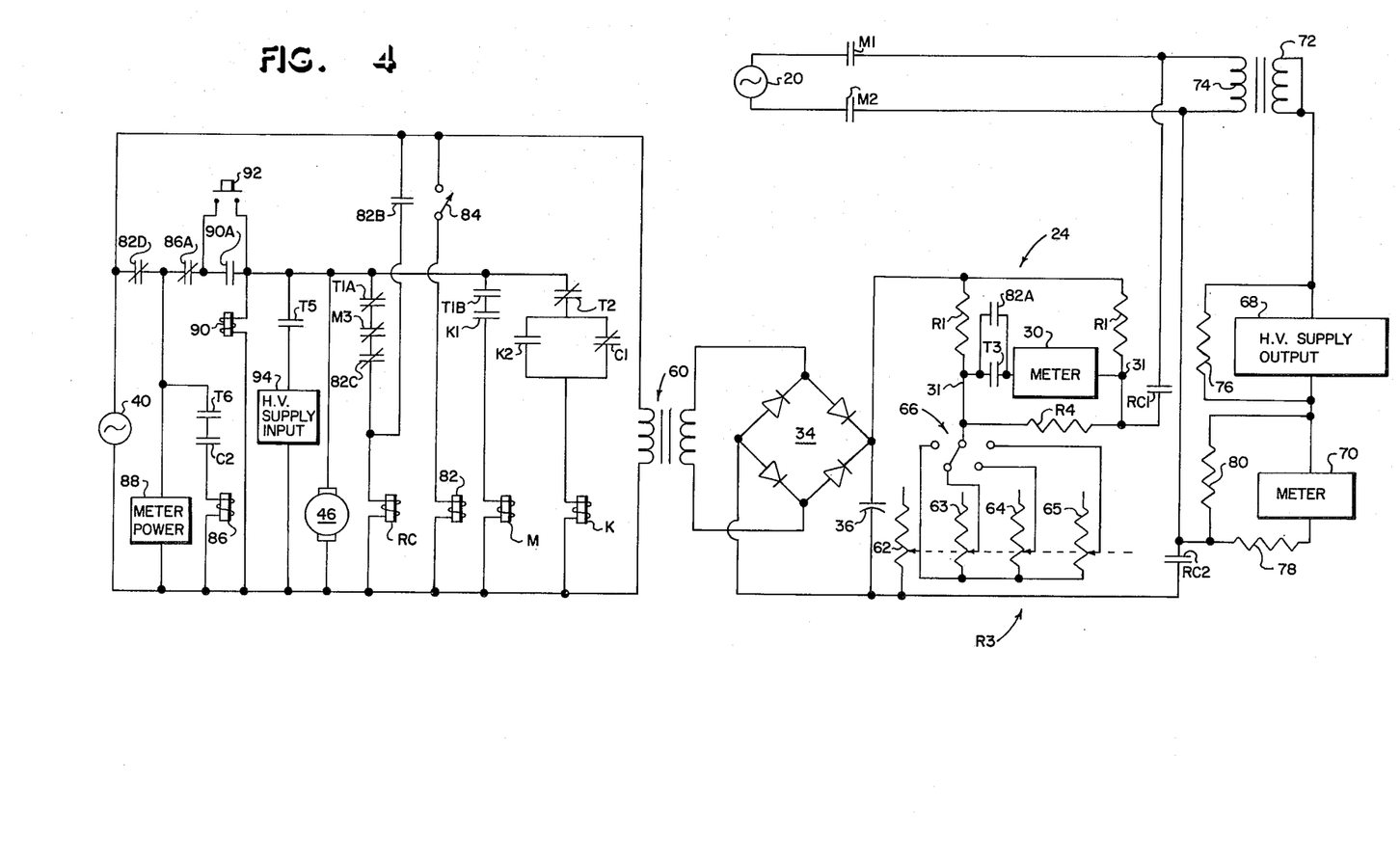
FIG. 4 is a schematic diagram of a transformer drying apparatus according to a second embodiment of the present invention.

Experience with using the apparatus of FIGS. 1 and 2 resulted in several improvements to that apparatus which are illustrated in FIG. 4. Generally stated, these improvements simplify the incrementing of the balancing resistance value to a desired high temperature value and provide an arrangement for detecting the actual resistance of insulation between transformer windings and automatically shutting down the drying apparatus when the insulation has sufficiently dried.

With particular reference to FIG. 4, most of the elements of FIGS. 1 and 2 are shown in a single interconnected circuit. The elements in FIG. 4 which are also found in FIG. 1 or 2 carry the same designation numbers or letters. To simplify the drawing the indicator lights 42 and 44 in parallel with the relay windings RC and M have been omitted. The function of these common elements are basically the same as in the earlier figures, but the timing has been somewhat modified as will be explained with respect to FIG. 5. In FIG. 4, the ac source 32 of FIG. 1 has been replaced by a transformer 60 which is powered from the ac source 40. Source 40 is typically a source of 120 volts and transformer 60 converts this down to a 12 volt ac output. The rectifier circuit 34 is indicated by a conventional full wave rectifier circuit comprising four diodes.

The resistor R3 of FIG. 1 has been replaced by a four section ganged potentiometer designated generally R3 in FIG. 4. The potentiometer includes variable resistive elements 62 through 65. In addition, a four-way selector switch 66 has been connected between one of the corners 31 of bridge 24 and the wipers of the four resistors 62 through 65. As illustrated, the switch 66 allows the selection of the variable resistor 62 or the series combination of the variable resistor 62 with any one of the variable resistors 63, 64 or 65. As will be explained in more detail below, variable resistor 62 is used in the initial nulling of the bridge circuit when a transformer winding is cold. After the initial nulling, the potentiometer wipers are not readjusted. Instead, the incrementing of the balancing resistor is achieved by actuating switch 66 to place one of the resistors 63, 64 or 65 in series with variable resistor 62.

The values of resistors 62 through 65 may be selected for various functions. Thus, as noted above, various transformer winding materials, typically copper and aluminum, have slightly different temperature coefficients of resistance. As a result, if a fixed drying temperature such as 110° C. is preferred, the resistors 63 through 65 may be selected to provide increments which select the appropriate temperature for the various materials. That is, to achieve a fixed temperature increase above the starting temperature for different winding materials it is necessary to provide a different percentage resistance increase for copper than for aluminum. The third selection is available for windings which are part aluminum and part copper.

In this preferred embodiment, resistor 62 has a maximum value of 1,000 ohms, resistor 63 has a maximum value of 300 ohms, resistor 64 has a maximum value of 350 ohms and resistor 65 has a maximum value of 400 ohms. With these values, selector switch 66 allows the incrementing of the initial balancing resistance 62 by 30%, 35% or 40%. Since the temperature coefficients of resistance of aluminum and copper are relatively close, these percentages were chosen to provide nominal dryer operation temperatures of 100° C., 110° C., and 120° C. assuming a starting temperature of 25° C. regardless of the type of wire used in the windings. In general, the 110° C. operating point is preferred. The switch 66 allows the selection of higher or lower operating temperatures as desired. In addition, the switch 66 may be used to compensate for differences in initial starting temperature of the windings. Thus, if the transformer being dried is for some reason at a higher temperature, such as 35° C. at the beginning of the drying cycle, it would be appropriate to select only a 30% resistance increase which would provide about a 75° C. temperature increase or a final operating temperature of 110° C. as desired.

In any case, the use of the present multielement ganged potentiometer avoids the need for actually measuring the initial winding resistance and calculating an appropriate increment needed to provide a given temperature increase. Thus, once the values of variable resistor 62 through 65 have been selected, an equipment operator need be only instructed to initially balance the meter 30 with switch 66 turned to a position contacting only resistor 62 and then turn switch 66 to one of the other three positions according to the desired operating temperature of the drying system. The net result is that the operator will adjust the equipment to provide a substantially fixed drying temperature for all transformers attached to the equipment regardless of variations in the transformers being dried.

As noted above, general practice in the transformer drying art has been to establish an elevated temperature of the transformer windings and to apply a vacuum condition to the transformer casing for a length of time known to be sufficient to properly dry the interwinding insulation. Since failure to sufficiently dry the insulation can result in total destruction of the transformer by internal shorting, it has been general practice to maintain a drying condition for much longer than is actually required in most cases. The result is obviously the underutilization of the drying equipment and increased cost of the drying process. The embodiment of FIG. 4 includes additional apparatus to automatically shut down the drying system when the interwinding insulation has been sufficiently dried. This apparatus is based primarily on a direct measurement of interwinding insulation resistance by application of a high voltage between primary and secondary windings and measurement of the resulting leakage current. The apparatus includes a high voltage power supply 68 and a micro-ammeter 70 connected in a series circuit between a transformer secondary winding 72 and a primary winding 74.

In this preferred embodiment, the high voltage supply 68 is powered by 120 volts ac input and provides a 5 kilovolt dc output at up to two milliamps of current. A resistor 76 is provided in parallel with supply 68 to bleed off the high voltage when the supply is turned off. The meter 70 is a micro-ammeter including a relay contact C2 and is adjusted to open the contactor C2 when test current drops below a level in the range of 10 to 25 microamps. Sensitivity is adjusted by resistors 78 and 80 positioned in series and in parallel, respectively, with meter 70. This current level corresponds to an insulation resistance of 200 to 500 megohms which is quite adequate at the 110° C. drying temperature. When the insulation cools to room temperature its resistance should exceed 800 megohms.

Several additional relays and switches have been added to the control circuitry shown in the left half of FIG. 4. As noted above, most of this circuitry is the same as that shown in FIG. 2 and carries the same designation numbers or letters as appropriate. The parts which do appear in both FIGS. 2 and 4 operate in FIG. 4 in essentially the same manner as they do in FIG. 2.

A first portion of the new circuitry includes a relay coil 82 which has associated contactors 82A, 82B, 82C and 82D. A manually operated switch 84 is provided for selectively supplying power from source 40 to the relay coil 82. When switch 84 is closed, the system is in a manual condition in which contactors 82a and 82b are closed while contactors 82c and 82d are opened. In this condition power is supplied to the bridge circuitry 24 and relay RC is activated so that the initial resistance settings may be made. When switch 84 is open the states of the four contactors 82a, 82b, 82c and 82d are reversed so that power may be supplied to the automatic control portion of the circuitry including timing motor 46 and the system may cycle through the various measurement and heating cycles as will be described in more detail below.

Another new portion of the circuitry includes a relay coil 86 and an associated contactor 86A connected in series with the contactor 82D and the power source 40 so that it may control application of power to the automatic control and switching network. The contactor C2 of meter 70 and an additional contactor T6 controlled by timing motor 46 are connected in series with the relay coil 86. Relay 86 operates to disconnect power to the remaining portions of the control circuitry whenever contactors C2 and T6 are closed simultaneously. Only the power input to meter 70 indicated by the block 88 in FIG. 4 is not affected by operation of relay 86. The power input 88 is controlled by the contactors 82D however.

Another new portion of the circuitry includes a relay coil 90 and its associated normally open contactor 90A. A normally open push button switch 92 is provided in parallel with contactor 90A. The relay 90 acts as a latching circuit in conjunction with the relay 86. Thus, if both relay contactors 82D and 86A are closed and the push button switch 92 is momentarily depressed to apply power to relay 90, the contactors 90A close to continue the supply of power to relay 90 and the remaining portions of the control circuitry until such time as either of the contactors 82D or 86A momentarily open.

The final new portion of the circuitry of FIG. 4 includes the power supply input indicated by the block 94 for the high voltage supply 68. A contactor T5 operated by the timing motor 46 controls the application of power from the source 40 to the supply input 94.

The operation of the circuit of FIG. 4 begins with the balancing of the bridge circuit 24 at an ambient temperature and incrementing of the reference resistance as discussed above. These additional balancing and incrementing steps are done after the switch 84 is closed so that power is supplied to the bridge 24 and it is in turn connected to transformer winding 74. Once these initial settings are made, the switch 84 is opened to begin the automatic operation.

Figure 5:
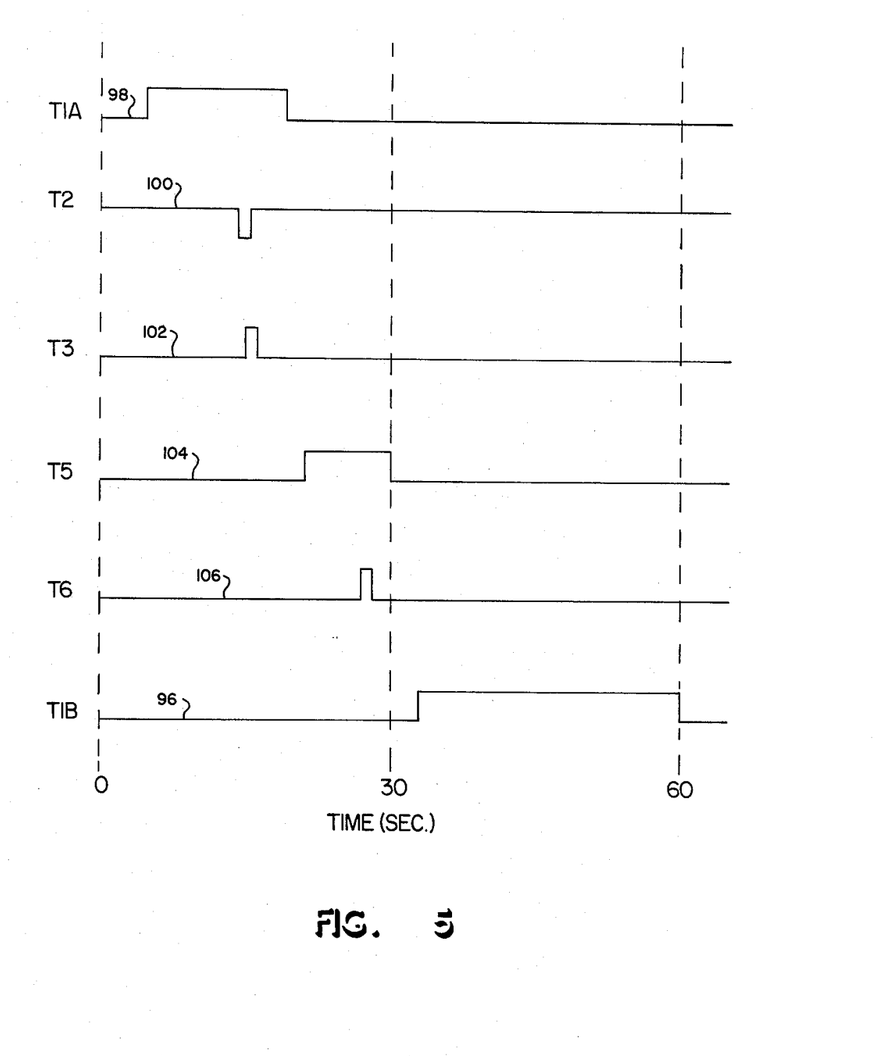
FIG. 5 is a diagram showing the time relation of the opening and closing of switches in the FIG. 4 embodiment.

With reference now to FIG. 5, there is provided a timing diagram for operation of the apparatus of FIG. 4.

In general, each of these timing sequences is controlled by cam actuated contactors driven by the timing motor 46. As indicated on the time scale in FIG. 5, one complete cycle occurs during a 60 second interval. As with the first embodiment, approximately half of each 60 second interval is allocated to applying power from ac supply 20 to the windings 72 and 74 for heating purposes. This part of cycle is indicated by the time plot 96 also designated T1B as in FIG. 3. The remaining portion of the cycle, that is the first thirty seconds, is divided into a winding resistance measurement period and an insulation resistance measurement period. The winding resistance measurement period is defined by the plots 98, 100 and 102, also designated T1A, T2 and T3 respectively. The plot T1A provides a time period during which contactor T1A is closed in FIG. 4 to activate the relay RC and therefore close contacts RC1 and RC2 to apply the low voltage dc power to winding 74 for resistance test purposes. The contactor T2 is opened momentarily during this period so that relay K is inactivated and shortly thereafter a contactor T3 is closed placing the null meter 30 into the bridge circuit for a measurement. The contactor T3 has been added to this embodiment to provide further protection for the meter 30 and to precisely define when a resistance measurement is to be taken. Since meter 30 is a null meter, its output will indicate a null condition whenever contactor T3 is open. Contactor C1 of meter 30 can be closed only during that time interval in plot 102 when contractor T3 is closed. Thus, by initially opening contactor T2 under control of timing motor 46, the relay K is deactivated and remains in this state until meter 30 has been connected into the circuit and allowed to stabilize. If the resistance is still too low so that contactor C1 is closed at the time contactor T2 is reclosed, then the relay K latches up to allow the relay M to function during the following heating cycle and provide further heating to the windings 72 and 74. If, on the other hand, meter 30 is nulled while contactor T3 is closed, relay K will not be activated when contactor T2 is reclosed and relay M will not be activated during the next heating period. When contactor T3 reopens meter 30 will remain nulled so that contactor C1 cannot close during the next heating period. As illustrated in FIG. 5, the resistance measurement cycle is completed in the first 18 seconds of the 60 second interval allowing time for the insulation resistance measurement prior to the next heating period.

Plots 104 and 106 also designated T5 and T6 indicate the timing sequence for a measurement of insulation resistance. Thus, plot 90 indicates that contactor T5 is closed at about the 22 second point of the one minute cycle so that the 5,000 volt dc potential is applied between winding 72 and 74. Approximately four seconds later, the contactor T6 is closed. If during this time, the current exceeds the 10 to 25 microamp level, contactor C2 remains open and the cycle continues with a heating cycle during the T1B time interval assuming that the previous resistance measurement indicated that the winding temperature was too low. In any case, the timing motor continues repeating the heating and testing cycles as described. If, on the other hand, meter 70 detects a current below the 10 to 25 microamp level, contactor C2 closes deactivating the rest of the circuitry including timing motor 46. When contactor C2 closes while contactor T6 is closed it actuates relay 86 which opens contactor 86A, at least momentarily. As noted above, whenever contactor 86A opens, the latching relay 90 also opens the contactor 90A so that power is removed from the high voltage supply 68 and the timing motor 46 stops so that the system cannot return to an operating condition without operator intervention. An indicator lamp is preferably connected to indicate when power is supplied to the timing motor 46 and thus to indicate when normal operation is proceeding. Thus, when this lamp turns off, the operator knows that the drying cycle is complete and the transformer may be disconnected and filled with oil. In this way the operator is able to dry the transformers in the minimum time required and thereby make better use of the equipment.

The other portions of the circuitry of FIG. 4 operate in the same fashion as described above with respect to FIGS. 1, 2 and 3 and need not be described in further detail here. The only difference in operation is the sequence of operations as described with respect to FIG. 5.

While the present invention has been illustrated and described with respect to particular apparatus and methods of use, it is apparant that various modifications and changes can be made within the scope of the present invention as defined by the appended claims.

What is claimed is:

1. An Apparatus for controllably heating a winding of a transformer, said transformer including a first winding of an unknown resistance, a second winding, and insulation disposed between said first and second winding, said apparatus comprising:

a resistance bridge circuit including balancing resistance means in one arm thereof and a balance detecting meter;

first switching means for connecting said first winding into another arm of said bridge circuit;

said balancing resistance means including a first variable resistor for initially balancing said bridge and presetting means for switchably incrementing said balancing means by an amount corresponding to a desired maximum temperature of said first winding;

second switching means for connecting said first winding to a source of current;

timing means for actuating said first and second switching means to alternately connect said first winding to said bridge circuit during a succession of measurement periods and to the source of current during a succession of heating periods;

first control means responsive to said meter for discontinuing the connecting of said first winding to said source of current for each heating period following a measurement period during which said bridge circuit is substantially balanced;

leakage current detection means for determining the resistance of insulation between said first and second windings;

third switching means for activating said leakage current detection means, said timing means controlling said first, second and third switching means to activate said leakage current detection means during a succession of insulation resistance test periods occurring after each measurement period and before each heating period, and second control means responsive to said leakage current detection means for deactivating said timing means upon determination of a resistance of said insulation of a minimum desired level when said insulation is at a temperature corresponding to the desired maximum heating temperature of said first winding.

2. The apparatus of claim 1, wherein said presetting means comprises a plurality of variable resistors having wipers mechanically coupled to a wiper of said first variable resistor.

3. An apparatus for controllably heating a power transformer having at least first and second windings and for drying insulation disposed between said first and second winding, said apparatus comprising:
a source of electrical power;
means for measuring the electrical resistance of said first winding for determining when said first winding has reached a predetermined temperature;
first switching means for connecting said first winding to said winding resistance measuring means;
second switching means for connecting said first winding to said source of electrical power;
means for measuring the electrical resistance of the insulation between said first and second windings;
third switching means for connecting said first and second windings to said insulation resistance measuring means;
timing means for actuating said first, second and third switching means to, during a succeession of measurement periods, sequentially connect said first winding to said winding resistance measuring means and connect said first and second windings to said insulation resistance measuring means, and, during a succession of heating periods alternating with said measurement periods, connect said first winding to said source of electrical power;
first control means responsive to said winding resistance measuring means for discontinuing the connecting of said first winding to said source of electrical power for each heating period following a measurement period during which the electrical resistance of said first winding is substantially equal to a preselected value corresponding to said predetermined temperature; and
second control means responsive to said insulation resistance measuring means for deactivating said timing means upon detection of electrical resistance of said insulation in excess of a preselected value at a temperature of said insulation corresponding to said predetermined temperature of said first winding.

4. An apparatus for drying the insulation of a transformer having at least first and second windings, comprising:
winding resistance measuring means for measuring the electrical resistance of the first winding;
first switching means for connecting said first winding to said winding resistance measuring means;
second switching means for connecting said first winding to a source of electrical power;
insulation resistance measuring means for measuring the dryness of said insulation;
third switching means for connecting said insulation resistance measuring means to said first and second windings;
timing means for actuating said first, second and third switching means to, during a succession of measurement periods, sequentially connect said winding resistance measuring means to said first winding and connect said insulation resistance measuring means to said first and second windings, and, during a succession of heating periods alternating with said measurement periods, connect the source of electrical power to said first winding;
first control means responsive to said winding resistance measuring means for bypassing each heating period following a measurement period during which the resistance of said first winding is substantially equal to a preselected value; and second control means responsive to said insulation resistance measuring means for deactivating said timing means when said insulation reaches a preselected dryness.

5. The apparatus of claim 4 wherein:
said insulation resistance measuring means comprises means for measuring the resistance of the insulation between said first and second windings; and wherein
the preselected dryness corresponds to a preselected insulation resistance.

6. The apparatus of claim 5 wherein said insulation resistance measure means comprises;
a high voltage power source; and
an ammeter coupled in series with said high voltage source.

7. The apparatus of claim 6 wherein said high voltage source is coupled to the second transformer winding.

8. A method of drying the insulation of a transformer having at least first and second windings, comprising;
sequentially and repeatedly (a) detecting the resistance of the first winding, (b) detecting the dryness of the insulation, and (c) applying electrical power to the first winding to heat the first winding and the insulation;
(d) discontinuing step (c) when the resistance of the first winding reaches a preselected level; and
(e) discontinuing steps (a), (b), and (c) when the insulation reaches a preselected dryness.

9. The method of claim 8, wherein step (b) comprises;
(f) applying a high voltage to the first and second transformer windings; and
(g) simultaneously detecting the leakage current which flows between the first and second windings.

10. The method of claim 8 further comprising, before step (a):
(h) connecting the first winding into one arm of a bridge cidrcuit having a variable balancing resistor in another arm thereof;
(i) adjusting the balancing resistor to balance the bridge circuit;
(j) simultaneously with step (i), adjusting a plurality of incremental resistors by an amount proportional to the adjustment made to the balancing resistor;
(k) switching a selected incremental resistor into the arm of the bridge circuit containing the balancing resistor, wherein the selected incremental resistor and the balancing resistor are coupled in series.

11. The method of claim 10, wherein step (a) comprises;
(m) applying a voltage to the first winding; and
(n) determing whether a null is present in the bridge circuit.

* * * * *